(12) United States Patent
Kwon et al.

(10) Patent No.: US 8,416,707 B2
(45) Date of Patent: *Apr. 9, 2013

(54) METHOD OF DETERMINING TRANSMISSION RATE OF CONTROL RESPONSE FRAME FOR ACKNOWLEDGING DATA RECEIPT IN WIRELESS LAN

(75) Inventors: Chang-yeul Kwon, Seongnam-si (KR); Chil-youl Yang, Yongin-si (KR); Kyung-ik Cho, Seoul (KR); Se-young Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

This patent is subject to a terminal disclaimer.

(21) Appl. No.: 12/782,997

(22) Filed: May 19, 2010

(65) Prior Publication Data
US 2010/0226351 A1    Sep. 9, 2010

Related U.S. Application Data

(63) Continuation of application No. 12/486,185, filed on Jun. 17, 2009, now Pat. No. 8,228,882, which is a continuation of application No. 12/014,044, filed on Jan. 14, 2008, now Pat. No. 7,606,211, which is a continuation of application No. 11/348,330, filed on Feb. 7, 2006, now Pat. No. 7,339,916.

(60) Provisional application No. 60/650,172, filed on Feb. 7, 2005.

(30) Foreign Application Priority Data

Feb. 25, 2005    (KR) .................... 10-2005-0016179

(51) Int. Cl.
*H04L 12/64* (2006.01)

(52) U.S. Cl. ...................................... 370/252; 370/338

(58) Field of Classification Search .................. 370/206, 370/208, 236, 252, 338, 349, 445, 447, 465, 370/466, 467, 468, 476
See application file for complete search history.

(56) References Cited

U.S. PATENT DOCUMENTS

| | | | |
|---|---|---|---|
| 5,909,469 | A | 6/1999 | Frodigh et al. |
| 7,002,900 | B2 * | 2/2006 | Walton et al. ................. 370/208 |

(Continued)

FOREIGN PATENT DOCUMENTS

| | | |
|---|---|---|
| CN | 1424858 A | 6/2003 |
| CN | 1440146 A | 9/2003 |

(Continued)

OTHER PUBLICATIONS

Extended European Search Report issued Jul. 27, 2010, in counterpart European Application No. 10161589.6.

(Continued)

*Primary Examiner* — Brian D Nguyen
(74) *Attorney, Agent, or Firm* — Sughrue Mion, PLLC

(57) ABSTRACT

A method is provided for determining a transmission rate of a control response frame for acknowledging data receipt in a wireless local area network. The method includes obtaining transmission parameters of a transmitting station from a data transmission frame received from the transmitting station, searching a receiving station for transmission parameters which correspond to the transmission parameters of the transmitting station, determining the transmission rate of the control response frame according to transmission parameters of the receiving station if the transmission parameters corresponding to the transmission parameters of the transmitting station are found in the receiving station, and determining a maximum rate among a set of basic transmission rates to be the transmission rate of the control response frame if the transmission parameters corresponding to the transmission parameters of the transmitting station are not found in the receiving station.

6 Claims, 6 Drawing Sheets

U.S. PATENT DOCUMENTS

| | | | |
|---|---|---|---|
| 7,640,373 B2 * | 12/2009 | Cudak et al. | 710/19 |
| 2002/0061031 A1 | 5/2002 | Sugar et al. | |
| 2003/0021240 A1 | 1/2003 | Moon et al. | |
| 2003/0072452 A1 | 4/2003 | Mody et al. | |
| 2003/0117956 A1 | 6/2003 | Lee | |
| 2003/0169769 A1 | 9/2003 | Ho et al. | |
| 2003/0185241 A1 | 10/2003 | Lu et al. | |
| 2004/0017790 A1 | 1/2004 | del Prado et al. | |
| 2004/0082356 A1 | 4/2004 | Walton et al. | |
| 2004/0141522 A1 | 7/2004 | Texerman et al. | |
| 2004/0151145 A1 | 8/2004 | Hammerschmidt | |
| 2004/0213191 A1 | 10/2004 | Lee | |
| 2004/0258025 A1 | 12/2004 | Li et al. | |
| 2004/0266466 A1 | 12/2004 | Kim et al. | |
| 2005/0032478 A1 | 2/2005 | Stephens et al. | |
| 2005/0117677 A1 * | 6/2005 | Sampath | 375/347 |
| 2005/0170781 A1 | 8/2005 | Jacobsen et al. | |
| 2005/0180360 A1 | 8/2005 | Hansen et al. | |
| 2005/0181800 A1 | 8/2005 | Trachewsky et al. | |
| 2005/0233709 A1 | 10/2005 | Gardner et al. | |
| 2005/0259686 A1 | 11/2005 | Lewis | |
| 2006/0034178 A1 | 2/2006 | Yang et al. | |
| 2006/0039275 A1 * | 2/2006 | Walton et al. | 370/208 |
| 2006/0056362 A1 | 3/2006 | Jang et al. | |
| 2006/0165008 A1 * | 7/2006 | Li et al. | 370/252 |
| 2006/0176908 A1 | 8/2006 | Kwon et al. | |
| 2006/0209937 A1 * | 9/2006 | Tanaka et al. | 375/219 |
| 2006/0252386 A1 * | 11/2006 | Boer et al. | 455/101 |
| 2007/0110091 A1 | 5/2007 | Kwon | |
| 2007/0116022 A1 | 5/2007 | Kwon et al. | |

FOREIGN PATENT DOCUMENTS

| | | |
|---|---|---|
| EP | 1480481 A1 | 11/2004 |
| KR | 10-2003-0087856 A | 3/2003 |
| KR | 10-2004-0053300 A | 6/2004 |
| KR | 10-2004-0069465 A | 8/2004 |
| KR | 10-2006-0015221 A | 2/2006 |
| RU | 98100195 A | 11/1999 |
| WO | 97/15158 A1 | 4/1997 |
| WO | 99/35765 A1 | 7/1999 |
| WO | 2004/072829 A2 | 8/2004 |

OTHER PUBLICATIONS

Extended European Search Report issued Jul. 27, 2010, in counterpart European Application No. 06715872.5.

Extended European Search Report issued Jul. 27, 2010, in counterpart European Application No. 10161672.0.

Chevillat, P. et al. "A Dynamic Link Adaptation Algorithm for IEEE 802.11a Wireless LANs" IEEE International Conference on Communications, May 2003, vol. 2, p. 1141-1145.

Lacage, Mathieu et al. "IEEE 802.11 Rate Adaptation: A Practical Approach" Insitut National de Recherche en Informatique et en Automatique, Oct. 4, 2004, p. 1-9.

Heindl, Armin et al. "The Impact of Backoff, EIFS, and Beacons on the Performance of IEEE 802.11 Wireless LANs" Computer Performance and Dependability Symposium, 2000, Proceedings IEEE International, Mar. 27, 2000, p. 103-112.

Holland, Gavin et al., "A Rate-Adaptive MAC Protocol for Multi-Hop Wireless Networks" ACM SIGMOBILE, Jul. 1, 2001, p. 236-250.

Chung, Young-uk et al., "An Efficient Reverse Link Data Rate Control Scheme for 1xEV-DV System", IEEE 54th Vehicular Technology Conference, Oct. 2001, vol. 2, p. 820-823.

Decision on Grant issued by the Russian Patent Office on Feb. 9.

International Search Report issued by the International Searching Authority on May 11.

Communication from the Canadian Patent Office issued Mar. 16, 2012 in counterpart Canadian Application No. 2,593,462.

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band", p. 1-82, IEEE Std 802.11a-1999 (Supplement to IEEE Std 802.11-1999), (Sponsor) LAN/MAN Standards Committee of the IEEE Computer Society Approved Sep. 16, 1999 IEEE-SA Standards Board.

"Information technology—Telecommunications and information exchange between systems—Local and metropolitan area networks—Specific requirements—Part 11: Wireless LAN Medium Access Control (MAC) and Physical Layer (PHY) Specifications", pp. 1-512, ANSI/IEEE Std 802.11, 1999 Edition, (Sponsor) LAN MAN Standards Committee of the IEEE Computer Society, ISO/IEC 8802-11:1999(E).

Communication dated Dec. 3, 2012 issued by the State Intellectual Property Office of P.R. China in counterpart Chinese Patent Application No. 201010166888.8.

* cited by examiner

FIG. 5A

TABLE. MCS

| BITS 18-23 IN HT-SIG1 (MCS INDEX) | NUMBER OF SPATIAL STREAMS | MODULATION | CODING RATE | GI = 800ns | | GI = 400ns | |
|---|---|---|---|---|---|---|---|
| | | | | RATE IN 20MHz | RATE IN 40MHz | RATE IN 20MHz | RATE IN 40MHz |
| 0 | 1 | BPSK | 1/2 | 6 | 13.5 | 6.67 | 15 |
| 1 | 1 | QPSK | 1/2 | 12 | 27 | 13.33 | 30 |
| 2 | 1 | QPSK | 3/4 | 18 | 40.5 | 20 | 45 |
| 3 | 1 | 16-QAM | 1/2 | 24 | 54 | 26.67 | 60 |
| 4 | 1 | 16-QAM | 3/4 | 36 | 81 | 40 | 90 |
| 5 | 1 | 64-QAM | 2/3 | 48 | 108 | 53.33 | 120 |
| 6 | 1 | 64-QAM | 3/4 | 54 | 121.5 | 60 | 135 |
| 7 | 1 | 64-QAM | 7/8 | 63 | 141.75 | 70 | 157.5 |
| 8 | 2 | BPSK | 1/2 | 12 | 27 | 13.33 | 30 |
| 9 | 2 | QPSK | 1/2 | 24 | 54 | 26.67 | 60 |
| 10 | 2 | QPSK | 3/4 | 36 | 81 | 40 | 90 |
| 11 | 2 | 16-QAM | 1/2 | 48 | 108 | 53.33 | 120 |
| 12 | 2 | 16-QAM | 3/4 | 72 | 162 | 80 | 180 |
| 13 | 2 | 64-QAM | 2/3 | 96 | 216 | 106.67 | 240 |
| 14 | 2 | 64-QAM | 3/4 | 108 | 243 | 120 | 270 |
| 15 | 2 | 64-QAM | 7/8 | 126 | 283.5 | 140 | 315 |
| 16 | 3 | BPSK | 1/2 | 18 | 40.5 | 20 | 45 |

FIG. 5B

TABLE. MCS

| BITS 18-23 IN HT-SIG1 (MCS INDEX) | NUMBER OF SPATIAL STREAMS | MODULATION | CODING RATE | GI = 800ns | | GI = 400ns | |
|---|---|---|---|---|---|---|---|
| | | | | RATE IN 20MHz | RATE IN 40MHz | RATE IN 20MHz | RATE IN 40MHz |
| 17 | 3 | QPSK | 1/2 | 36 | 81 | 40 | 90 |
| 18 | 3 | QPSK | 3/4 | 54 | 121.5 | 60 | 135 |
| 19 | 3 | 16-QAM | 1/2 | 72 | 162 | 80 | 180 |
| 20 | 3 | 16-QAM | 3/4 | 108 | 243 | 120 | 270 |
| 21 | 3 | 64-QAM | 2/3 | 144 | 324 | 160 | 360 |
| 22 | 3 | 64-QAM | 3/4 | 162 | 364.5 | 180 | 405 |
| 23 | 3 | 64-QAM | 7/8 | 189 | 425.25 | 210 | 472.5 |
| 24 | 4 | BPSK | 1/2 | 24 | 54 | 26.67 | 60 |
| 25 | 4 | QPSK | 1/2 | 48 | 108 | 53.33 | 120 |
| 26 | 4 | QPSK | 3/4 | 72 | 162 | 80 | 180 |
| 27 | 4 | 16-QAM | 1/2 | 96 | 216 | 106.67 | 240 |
| 28 | 4 | 16-QAM | 3/4 | 144 | 324 | 160 | 360 |
| 29 | 4 | 64-QAM | 2/3 | 192 | 432 | 213.33 | 480 |
| 30 | 4 | 64-QAM | 3/4 | 216 | 486 | 240 | 540 |
| 31 | 4 | 64-QAM | 7/8 | 252 | 567 | 280 | 630 |
| 32 | 1 | BPSK | 1/2 | | 6 | | 6.67 |

METHOD OF DETERMINING TRANSMISSION RATE OF CONTROL RESPONSE FRAME FOR ACKNOWLEDGING DATA RECEIPT IN WIRELESS LAN

CROSS-REFERENCE TO RELATED APPLICATIONS

This application is a Continuation application of U.S. patent application Ser. No. 12/486,185 filed Jun. 17, 2009, now U.S. Pat. No. 8,228,882, which is a Continuation application of U.S. patent application Ser. No. 12/014,044 filed Jan. 14, 2008, now U.S. Pat. No. 7,606,211, which is a Continuation application of U.S. patent application Ser. No. 11/348,330 filed Feb. 7, 2006, now U.S. Pat. No. 7,339,916, which claims priority from Korean Patent Application No. 10-2005-0016179, filed on Feb. 25, 2005 in the Korean Intellectual Property Office, and U.S. Provisional Patent Application No. 60/650,172, filed on Feb. 7, 2005 in the U.S. Patent and Trademark Office, the disclosures of which are incorporated herein in their entirety by reference.

BACKGROUND OF THE INVENTION

1. Field of the Invention

Methods consistent with the present invention relate to determining a transmission rate of a control response frame for acknowledging data receipt in a wireless local area network (LAN).

2. Description of the Related Art

In wireless LAN environments, a medium access control (MAC) protocol of a carrier sense multiple access/collision avoidance (CSMA/CA) mechanism is used. The CSMA/CA mechanism is designed to avoid collisions by transmitting a signal when there is no data transmission through a cable of a network and sending data only after it is confirmed that the signal is transmitted without collisions.

The CSMA/CA mechanism works as follows: a terminal attempts to sense a carrier indicating that another terminal is already transmitting data and, if the carrier is sensed, the terminal waits for a random period of time. After the random period of time, the terminal attempts to sense the carrier again. If no other carriers are sensed, the terminal starts to send data.

In the CSMA/CA mechanism, carrier sensing is performed using both physical carrier sensing and virtual carrier sensing. Physical carrier sensing is performed at a physical layer (PHY), which senses whether a received power exceeds a predetermined threshold and informs an MAC layer of whether a medium is "busy" or "idle" based on the sensing result.

In virtual carrier sensing, if an MAC protocol data unit (MPDU) can be accurately extracted from a received PHY packet data unit (PPDU), a "Duration/ID" field, which is one of a plurality of header fields of the MPDU, is interpreted. If the result of an interpretation indicates that a medium is "busy", the medium is regarded as "busy" for a period of time that the medium is expected to be used. As described above, whether or not a medium is "busy" is determined using the two carrier sensing methods, and the medium is not accessed if busy.

An MPDU/PHY service data unit (PSDU) received must be interpreted normally to effectively apply the virtual carrier sensing method to the CSMA/CA mechanism. In other words, for the virtual carrier sensing method, a value of an MAC header must be read normally. If errors occur due to an unstable channel when data is transmitted at a high transmission data rate, or if a receiving station cannot handle the high transmission data rate, the MPDU/PSDU cannot be interpreted. In this case, virtual carrier sensing is not possible and thus, the CSMA/CA mechanism is ineffective.

FIG. 1 illustrates an IEEE 802.11a-based legacy PPDU frame format. Referring to FIG. 1, if preamble and signal fields in the PPDU frame format are received normally, duration information of a data field can be estimated using rate and length information included in the signal field. Hence, information contained in the preamble and signal fields is useful for a clear channel assessment (CCA) mechanism.

If the preamble and signal fields in the PPDU frame being received are interpreted but a frame check sequence (FCS) error occurs at a receiving station, an MAC layer controls the receiving station to wait for an extended interframe space (EIFS), which is 94 μs in the case of IEEE 802.11a, not a DCF interframe space (DIFS), which is 34 μs in the case of IEEE 802.11a, and backs off.

In other words, if high throughput (HT) stations and legacy stations (802.11a/b/g) with different transmission capabilities coexist on a wireless LAN, the legacy stations cannot interpret an HT frame. Thus, the MAC layers respectively included in the legacy stations fail to accurately carry out virtual carrier sensing and rely only on physical carrier sensing.

Even if the preamble and signal fields of an HT PPDU frame are formatted such that the legacy stations can interpret them, the legacy stations cannot accurately interpret the data field. Thus, the legacy stations have the FCS error and regard the HT PPDU frame as a flawed frame. Then, the MAC layers control the respective legacy stations to wait for the DIFS. On the other hand, stations that can handle a high transmission rate, i.e., the HT stations, can carry out accurate virtual carrier sensing. Thus, the HT stations wait for the DIFS as usual.

Since EIFS=short interframe space (SIFS)+TACK (at the lowest data rate)+DIFS, stations that cannot handle the data rate, i.e., the legacy stations with lower transmission capabilities than the HT stations, are given lower medium access priorities than the HT stations. As a result, medium access fairness for all stations, which is maintained by a distributed coordination function (DCF), cannot be secured.

However, the medium access fairness can be secured when a legacy acknowledgement (ACK) frame is used for acknowledging data transmission on the wireless LAN as illustrated in FIG. 2.

An HT transmitting station HT SRC transmits data to an HT receiving station HT DEST using the HT PPDU frame format. Then, the HT transmitting station HT SRC and the HT receiving station HT DEST wait for a SIFS. After the SIFS, the HT receiving station HT DEST transmits an ACK frame in a legacy format to the HT transmitting station HT SRC to confirm the receipt of data.

When the HT transmitting station transmits the ACK frame in the legacy format, other legacy stations (802.11a-based stations in FIG. 2) as well as the HT receiving station interpret the data field normally. Thus, all stations wait for a DIFS. Consequently, all stations can compete for medium access on an equal footing.

In an IEEE 802.11 standard, if a receiving station supports a frame transmission rate used by a transmitting station, the frame transmission rate is determined to be a transmission rate of a control response frame. If the receiving station does not support the frame transmission rate, the maximum transmission rate among a set of basic transmission rates supported by the wireless LAN is determined to be the transmission rate of the control response frame.

As described above, on the wireless LAN where HT stations and legacy stations with different transmission capabilities coexist, a legacy ACK frame is used for acknowledging data receipt. Accordingly, a transmission rate must be determined using a method different from a conventional method.

SUMMARY OF THE INVENTION

The present invention provides a method of determining a transmission rate of a control response frame for acknowledging data receipt, which enables HT stations and legacy stations with different transmission capabilities to access a medium on an equal footing in a wireless LAN environment where the stations coexist, thereby complementing a carrier sensing method.

According to an aspect of the present invention, there is provided a method of determining a transmission rate of a control response frame for acknowledging data receipt in a wireless local area network where high throughput stations and legacy stations with different data transmission capabilities coexist. The method includes: (a) obtaining transmission parameters of a transmitting station from a data transmission frame received from the transmitting station; (b) searching a receiving station for transmission parameters which correspond to the obtained transmission parameters of the transmitting station; and (c) determining the transmission rate of the control response frame based on the search result.

If the transmission parameters corresponding to the obtained transmission parameters of the transmitting station are found in the receiving station, the transmission rate of the control response frame is determined according to the obtained transmission parameters of the receiving station, and if the transmission parameters corresponding to the obtained transmission parameters of the transmitting station are not found in the receiving station, a maximum rate among a set of basic transmission rates included in the receiving station is determined to be the transmission rate of the control response frame.

In operation (a), if the data transmission frame received from the transmitting station is a high throughput PHY packet data unit frame, the transmission parameters of the transmitting station are obtained from a signal field of the high throughput PHY packet data unit frame with reference to a modulation coding scheme index.

In operation (a), if the data transmission frame received from the transmitting station is a legacy PHY packet data unit frame, the transmission parameters of the transmitting station are obtained from a signal field of the legacy PHY packet data unit frame with reference to a rate field.

In operation (b), the receiving station is searched for transmission parameters corresponding to a legacy format among the transmission parameters of the receiving station, which correspond to the obtained transmission parameters of the transmitting station.

Operation (c) includes: (c1) determining whether the transmitting station supports the transmission rate of the control response frame determined according to the obtained transmission parameters of the receiving station if the transmission parameters corresponding to the obtained transmission parameters of the transmitting station are found in the receiving station; and (c2) determining the transmission rate of the control response frame based on the result of determination.

In operation (c2), if the receiving station supports the determined transmission rate, the determined transmission rate of the control response frame is used, and if the receiving station does not support the determined transmission rate, the maximum rate among the set of basic transmission rates is determined to be the transmission rate of the control response frame.

The transmission parameters include a number of spatial streams, a modulation scheme, and a coding rate. The control response frame has a legacy format. The control response frame is a clear-to-send frame or an ACK frame. The high throughput stations include systems that use multiple-input-multiple-output technology. The high throughput stations include systems that use channel bonding.

The legacy stations include systems that meet an IEEE 802.11 a/b/g standard.

According to another aspect of the present invention, there is provided a computer-readable recording medium on which a program is recorded for executing a method of determining a transmission rate of a control response frame for acknowledging data receipt in a wireless local area network where high throughput stations and legacy stations with different data transmission capabilities coexist.

BRIEF DESCRIPTION OF THE DRAWINGS

The above and/or other aspects of the present invention will become more apparent by describing in detail exemplary embodiments thereof with reference to the attached drawings in which:

FIG. 5A and FIG. 5B illustrate a table of a modulation coding scheme (MCS) field that defines modulation and coding schemes in the HT PPDU frame format.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments are provided so that this disclosure will be thorough and complete, and will fully convey the concept of the invention to those skilled in the art.

Figure 1:
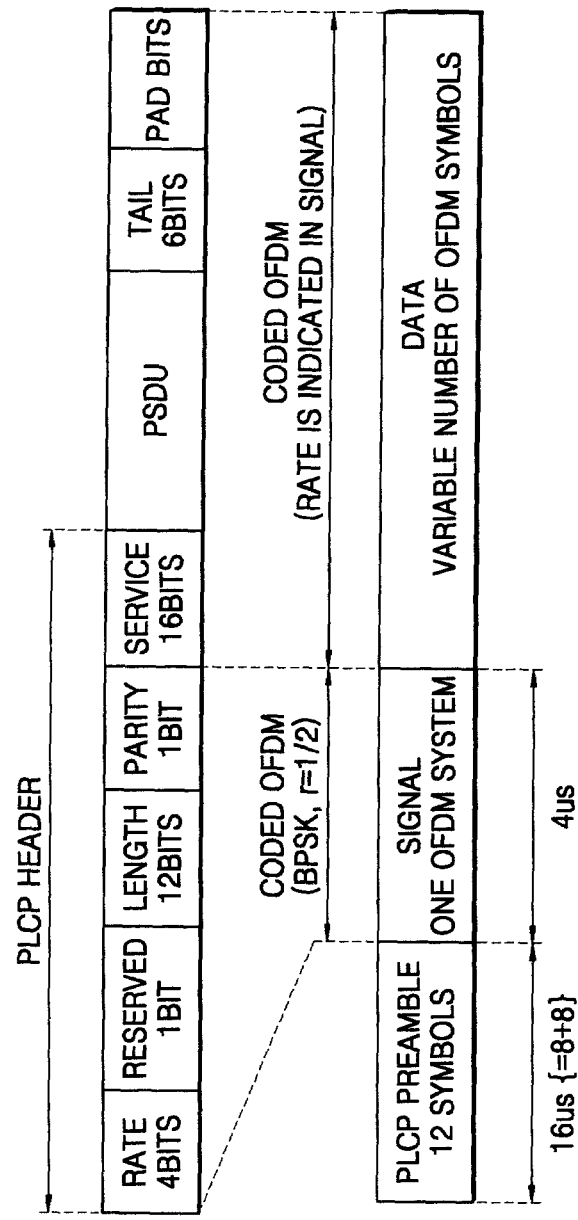
FIG. 1 illustrates an IEEE 802.11a-based legacy PPDU frame format.
Figure 2:
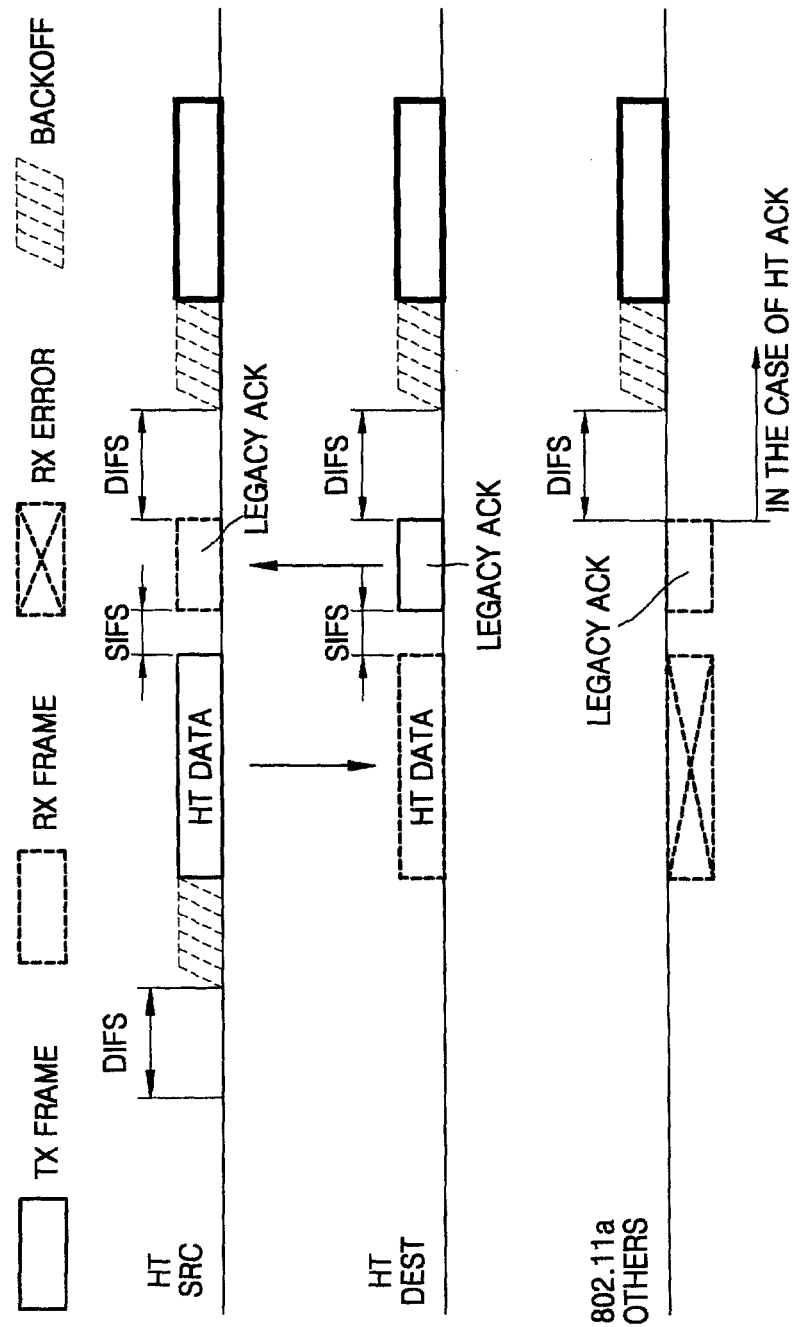
FIG. 2 illustrates data and legacy ACK frame transmissions on a wireless LAN where HT stations and legacy stations with different transmission capabilities coexist.
Figure 3:
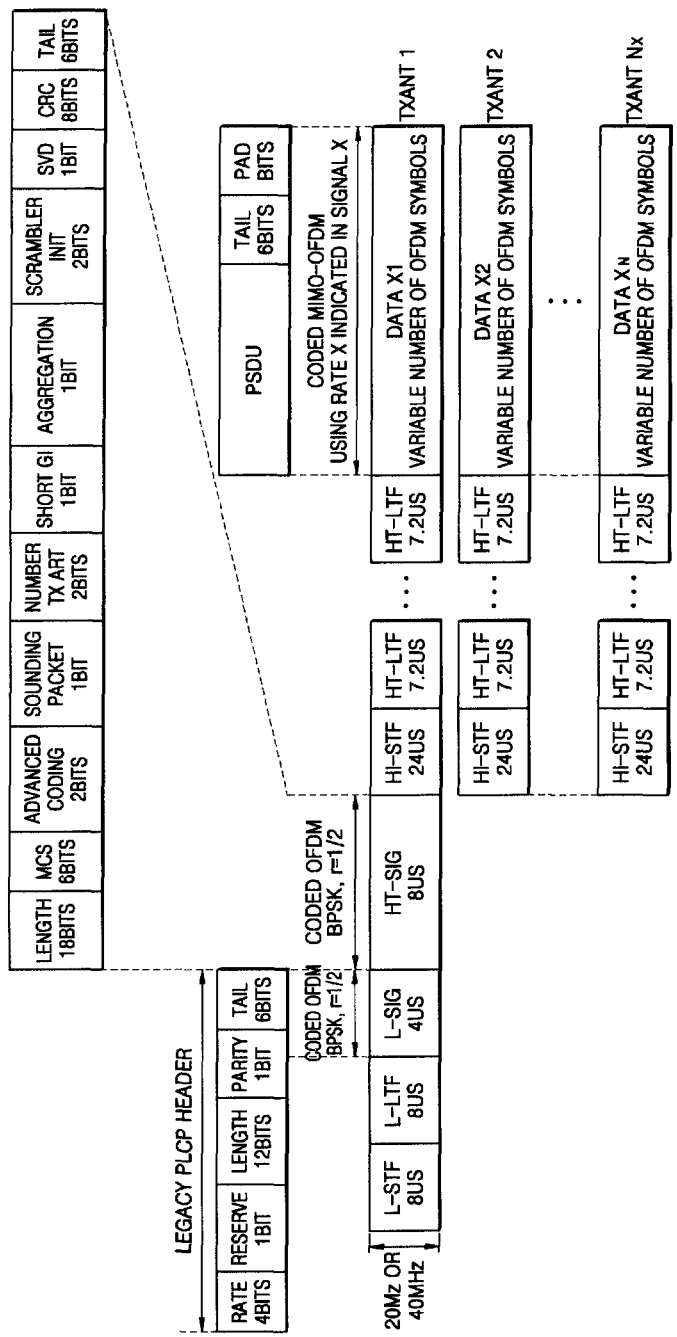
FIG. 3 illustrates an HT PPDU frame format.
Figure 4:
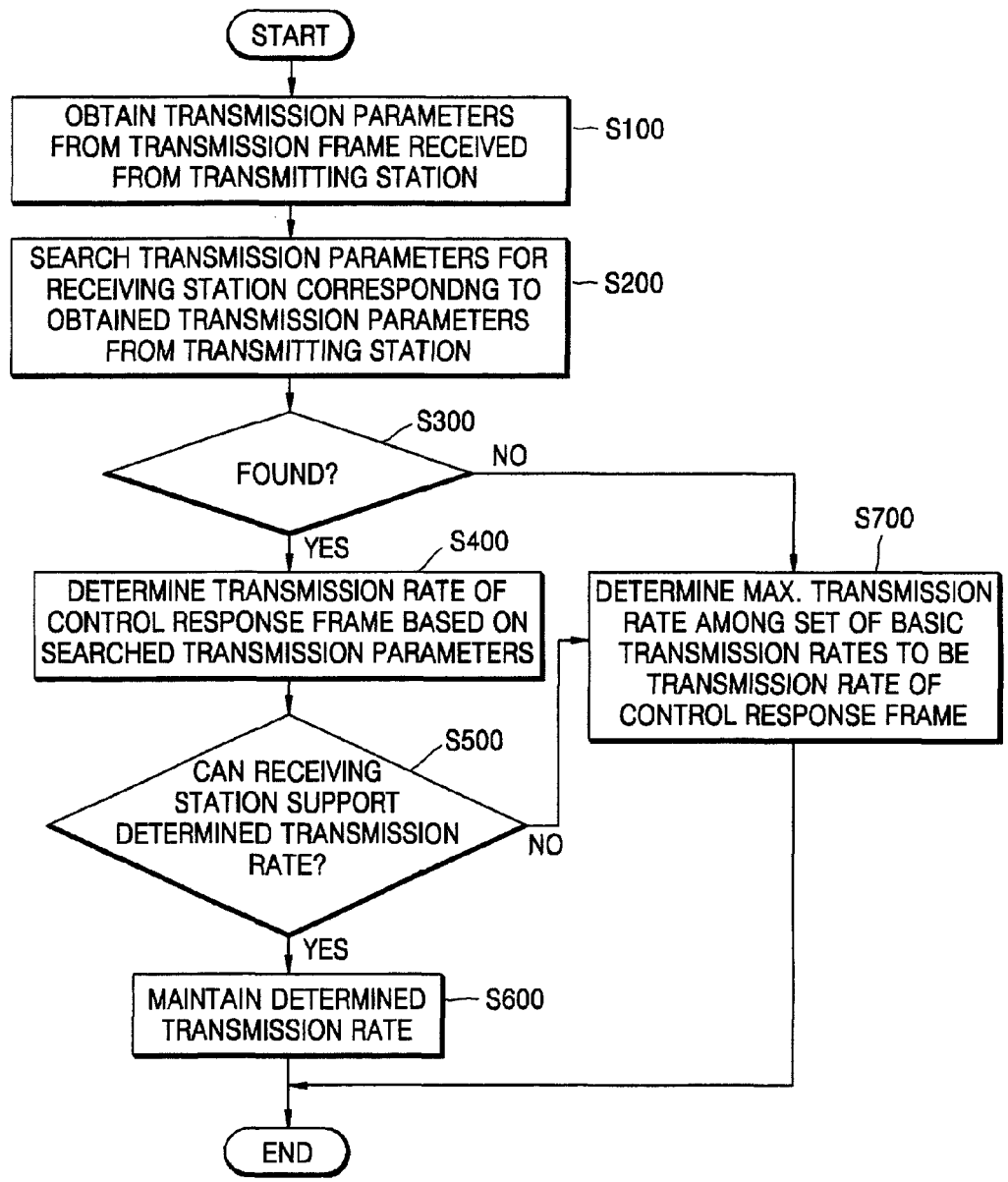
FIG. 4 is a flowchart illustrating a method of determining a transmission rate of a control response frame for acknowledging data receipt in the wireless LAN where HT stations and legacy stations with different transmission capabilities can coexist according to an exemplary embodiment of the present invention.

FIG. 4 is a flowchart illustrating a method of determining a transmission rate of a control response frame for acknowledging data receipt in a wireless LAN where HT stations and legacy stations with different transmission capabilities can coexist according to the present invention. Referring to FIG. 4, to determine the transmission rate of the control response frame for acknowledging data receipt, a receiving station obtains transmission parameters from a data transmission frame received from a transmitting station (S100).

If the data transmission frame received from the transmitting station is an HT PPDU frame, the transmission parameters are obtained from a signal field of the HP PPDU frame with reference to a modulation coding scheme (MCS) index.

If the data transmission frame received from the transmitting station is a legacy PPDU frame, the transmission parameters are obtained from a signal field of the legacy PPDU frame with reference to a rate field.

The transmission parameters used in the present exemplary embodiment include a number of spatial streams, a modulation scheme and a coding rate. Different transmission parameters may be used in other embodiments.

Next, the receiving station searches for transmission parameters corresponding to the obtained transmission parameters of the transmitting station (S200). In operation S200, the receiving station searches for transmission parameters corresponding to a legacy format among its transmission parameters corresponding to the obtained transmission parameters of the transmitting station. In other words, referring to FIG. 5A and FIG. 5B, the receiving station searches for transmission parameters satisfying the condition that the number of spatial streams is one (i.e., MCS indices of 0 through 7). Then, among its transmission parameters satisfying the condition, the receiving station searches for transmission parameters that also satisfy other transmission parameters of the transmitting station.

It is determined whether the receiving station has transmission parameters corresponding to the obtained transmission parameters of the transmitting station (S300). If it is determined that the receiving station has the transmission parameters corresponding to the obtained transmission parameters of the transmitting station, a transmission rate of a control response frame is determined according to the transmission parameters of the receiving station, which correspond to the obtained transmission parameters of the transmitting station (S400).

If it is determined that the receiving station does not have the transmission parameters corresponding to the obtained transmission parameters of the transmitting station, operation S700 is performed. That is, the maximum transmission rate among a set of basic transmission rates supported in a wireless LAN environment is determined to be the transmission rate of the control response frame.

If it is determined that the receiving station supports the determined transmission rate of the control response frame determined in operation S400 (S500), the receiving station transmits the control response frame at the determined transmission rate (S600).

If it is determined that the receiving station does not support the determined transmission rate, the maximum transmission rate among a set of basic transmission rates supported in the wireless LAN environment is determined to be the transmission rate of the control response frame (S700).

In the present exemplary embodiment, the control response frame may be a clear to send (CTS) frame or an ACK frame.

FIG. 5A and FIG. 5B illustrate a table of an MCS field that defines modulation and coding schemes in the HT PPDU frame format. Referring to FIG. 5A and FIG. 5B, 16 bits are used for the MCS field, which includes fields indicating an MCS index, a number of spatial streams, a modulation scheme, a coding rate, and a transmission rate. In the present exemplary embodiment, the MCS table of FIG. 5A and FIG. 5B is used. However, the MCS table may be user defined.

The method of determining the transmission rate of the control response frame to acknowledge data receipt illustrated in FIG. 4 will now be described with reference to the MCS table of FIG. 5A and FIG. 5B by using an example.

It is assumed that a receiving station has received data from a transmitting station at a transmission rate corresponding to MCS index 14. With reference to the MSC index 14, the receiving station determines that the number of spatial streams is two, the modulation scheme is 64-QAM, the coding rate is ¾, and the transmission rate is 108 from the signal field of the HT PPDU frame indicated in the received data.

The receiving station searches for a transmission rate that satisfies the conditions that the number of spatial streams is one, the modulation scheme is 64-QAM, and the coding rate is ¾, and determines that the transmission rate 54 satisfies the conditions. If no transmission rate satisfying these conditions is found, the maximum transmission rate among a set of basic transmission rates supported in the wireless LAN environment is determined to be the transmission rate of the control response frame.

It is determined whether the receiving station supports the transmission rate 54. If it is determined that the receiving station supports the transmission rate 54, the receiving station maintains the transmission rate 54. If it is determined that the receiving station does not support the transmission rate 54, the maximum transmission rate among the set of basic transmission rates supported in the wireless LAN environment is determined to be the transmission rate of the control response frame.

As described above, according to a method of determining a transmission rate of a control response frame for acknowledging data receipt in a wireless LAN, medium access fairness can be secured in a wireless LAN environment where HT stations and legacy stations with different transmission capabilities coexist. In addition, the transmission rate of the control response frame can be determined appropriately for the wireless LAN environment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of determining a transmission rate of a control response frame for acknowledging data receipt in a wireless network wherein at least one high throughput station and at least one legacy station with different data transmission capabilities respectively coexist, the method comprising:
   obtaining, by receiving station, a modulation scheme and a coding rate of a data transmission frame of a high throughput format received from a transmitting high throughput station; and
   determining, at the receiving station, the transmission rate of the control response frame based on a value corresponding to the obtained modulation scheme and the obtained coding rate among transmission parameters corresponding to a legacy format of a receiving station, wherein the obtained modulation scheme indicates 16-QAM and the obtained coding rate indicates ¾.

2. The method of claim 1, wherein the modulation scheme and the coding rate of the data transmission frame are obtained from a signal field of the data transmission frame with reference to a modulation coding scheme index.

3. The method of claim 1, the control response frame is a clear-to-send frame or an acknowledgement frame.

4. The method of claim 1, wherein the high throughput station transmits or receives data using multiple-input-multiple-output technology.

5. The method of claim 1, wherein the high throughput station transmits or receives data using channel bonding.

6. The method of claim 1, wherein the legacy station transmits or receives data in compliance with an IEEE 802.11a/b/g standard.

* * * * *